(12) United States Patent
Mielke et al.

(10) Patent No.: US 12,722,308 B2
(45) Date of Patent: Sep. 1, 2026

(54) OPTIMALLY CONTROLLED TAPE REMOVAL SYSTEM AND METHOD

(71) Applicant: 3M INNOVATIVE PROPERTIES COMPANY, St. Paul, MN (US)

(72) Inventors: Erich A. Mielke, St. Paul, MN (US); Brett R Hemes, Woodbury, MN (US); John J. Schmidt, Mathtomedi, MN (US); John W. Henderson, St. Paul, MN (US); Xin Dong, Woodbury, MN (US); Timothy J. Reddy, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/573,301

(22) PCT Filed: Jun. 30, 2022

(86) PCT No.: PCT/US2022/035754
§ 371 (c)(1),
(2) Date: Dec. 21, 2023

(87) PCT Pub. No.: WO2024/005828
PCT Pub. Date: Jan. 4, 2024

(65) Prior Publication Data

US 2025/0229434 A1 Jul. 17, 2025

(51) Int. Cl.
*B25J 13/08* (2006.01)
*B25J 9/16* (2006.01)
*B25J 11/00* (2006.01)

(52) U.S. Cl.
CPC ........... *B25J 13/085* (2013.01); *B25J 9/1633* (2013.01); *B25J 9/1679* (2013.01); *B25J 11/005* (2013.01)

(58) Field of Classification Search
CPC .............. B29C 63/0013; B29C 63/0073; B25J 9/1687; B25J 9/1697; B25J 9/1679;
(Continued)

(56) References Cited

U.S. PATENT DOCUMENTS 9,517,615 B2 12/2016 Dong et al.
2015/0039126 A1 2/2015 Shiino et al.
(Continued)

FOREIGN PATENT DOCUMENTS

DE 102019215943 A1 * 4/2021 ......... B29C 63/0013
JP 2002316087 A * 10/2002 ......... B29C 63/0013
(Continued)

OTHER PUBLICATIONS

Aubrey, D.W., Welding, G.N. and Wong, T. (1969), Failure mechanisms in peeling of pressure-sensitive adhesive tape. J. Appl. Polym. Sci., 13: 2193-2207. https://doi.org/10.1002/app.1969.070131014 (Year: 1969).*
Translation of DE 102019215943 A1 (Year: 2019).*
Hu, D.C., Chen, H.C. Humidity effect on polyimide film adhesion. J Mater Sci 27, 5262â5268 (1992). https://doi.org/10.1007/BF00553402 (Year: 1992).*
Translation of JP 2002316087 A (Year: 2002).*
International Search Report for PCT International Application No. PCT/US2022/035754, mailed on Jan. 25, 2023, 4 pages.

*Primary Examiner* — Adam R Mott
*Assistant Examiner* — James Miller Watts, III
(74) *Attorney, Agent, or Firm* — Jonathan V. Sry

(57) ABSTRACT

Automated systems and methods of using an end-effector mounted on a robot arm to remove a tape from an object surface are provided. The end-effector includes a gripping mechanism and a force sensor, which is instructed by a controller to automatically detect the peeling state and adjust its peeling parameters to optimize the removal while the end-effector moves along the object surface to remove the tape.

15 Claims, 7 Drawing Sheets

(58) Field of Classification Search
CPC ...... B25J 9/1633; B25J 13/085; B25J 11/005; B25J 11/00; B25J 9/1664; B25J 13/08; B25J 9/1653; B05B 12/24; B23P 19/047; B23P 19/04; B23P 2700/50; B65B 51/06; B32B 38/10; B32B 43/006; B32B 2038/1891; B32B 41/00; Y10T 156/195; Y10T 156/1989; Y10T 156/1168; B23K 2101/34; B23K 2101/006; B26D 1/5475; B26D 3/28; C09J 5/00; H05K 2203/0264; H05K 2203/0191; B65H 2801/51; B65H 2301/51122; B65H 2404/5391; B65H 2701/377; G05B 2219/45065
See application file for complete search history.

(56) References Cited

U.S. PATENT DOCUMENTS

2015/0261206 A1* 9/2015 Shiino .................... B25J 9/1612
700/257
2015/0336271 A1 11/2015 Spicer et al.
2020/0148491 A1 5/2020 Lin et al.

FOREIGN PATENT DOCUMENTS

JP 2010175450 A 8/2010
WO 2002055302 A1 7/2002

* cited by examiner

OPTIMALLY CONTROLLED TAPE REMOVAL SYSTEM AND METHOD

CROSS-REFERENCE TO RELATED APPLICATIONS

This application is a national stage filing under 35 U.S.C. § 371 of International Patent Application No. PCT/US2022/035754, filed 30 Jun. 2022, the entire disclosure of which is incorporated herein by reference.

BACKGROUND

Various tapes such as a masking tape or a protective tape can be applied onto object surfaces such as surfaces of car parts or replacement parts. These tapes can be removed from the object surface by manpower or a robot system. Current tape peel processes and systems are generally labor intensive and are not conducted in an optimally controlled manner.

SUMMARY

There is a desire to remove tapes from object surfaces in an optimally controlled manner. When peeling tape, there are a variety of trajectories that can be taken, involving various peeling parameters including a peel angle, a peel velocity, etc. Depending on the object surfaces, as well as the conditions enforced on the tape, a specific peel force may be preferred to avoid peeling defects such as ripping the tape, damaging the object surface, removing paint (e.g., when the object surface is a painted surface). The present disclosure provides automated systems and methods to remove tapes from object surfaces. The automated system includes a gripper for removing a tape from the object surface, and the accompanying algorithms to ensure the proper trajectory is followed to maintain the desired peel parameters. The optimal parameters may be determined in a data-driven approach, and may differ depending on tape type, substrate, and environmental and situational conditions.

In one aspect, the present disclosure describes a method of removing a tape attached to an object surface, the method comprising: providing a robot including an end-effector, the end-effector comprising a gripping mechanism and a force sensor; initializing the robot to position the end-effector with respect to the tape on the object surface; gripping, via the gripping mechanism, a tab of the tape; and moving the end-effector along the object surface to remove the tape from the object surface according to a set of peeling parameters. While the end-effector moves along the object surface to remove the tape, the method further includes measuring, via the force sensor, a peel force; adjusting a movement trajectory of the end-effector to maintain a value of the peel force in a desired range; and determining at least another peeling parameter of the set of peeling parameters based on the peel force, comprising determining at least one of a peel velocity and a peel angle.

In another aspect, the present disclosure describes an automated system to remove a tape from an object surface, the system including an end-effector comprising a gripping mechanism and a force sensor; a vision system comprising one or more imaging sensors to obtain imaging data for the tape, the object surface, and the end-effector; and a controller functionally connected to the end-effector and the vision system. The controller is configured to initialize the end-effector with respect to the tape on the object surface; grip, via the gripping mechanism, a tab of the tape; and move the end-effector along the object surface to remove the tape from the object surface according to a set of peeling parameters. While the end-effector moves along the object surface to remove the tape, the controller is configured to measure, via the force sensor, a peel force; adjust a movement trajectory of the end-effector to maintain a value of the peel force in a desired range; and determine at least another peeling parameter of the set of peeling parameters based on the peel force, including determining at least one of a peel velocity and a peel angle.

Various unexpected results and advantages are obtained in exemplary embodiments of the disclosure. One such advantage of exemplary embodiments of the present disclosure is that by moving an end-effector at optimized peel angles and velocities, and by maintaining a record of peel forces, the methods and systems described herein can ensure that tape failure does not occur during removal.

Various aspects and advantages of exemplary embodiments of the disclosure have been summarized. The above Summary is not intended to describe each illustrated embodiment or every implementation of the present exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
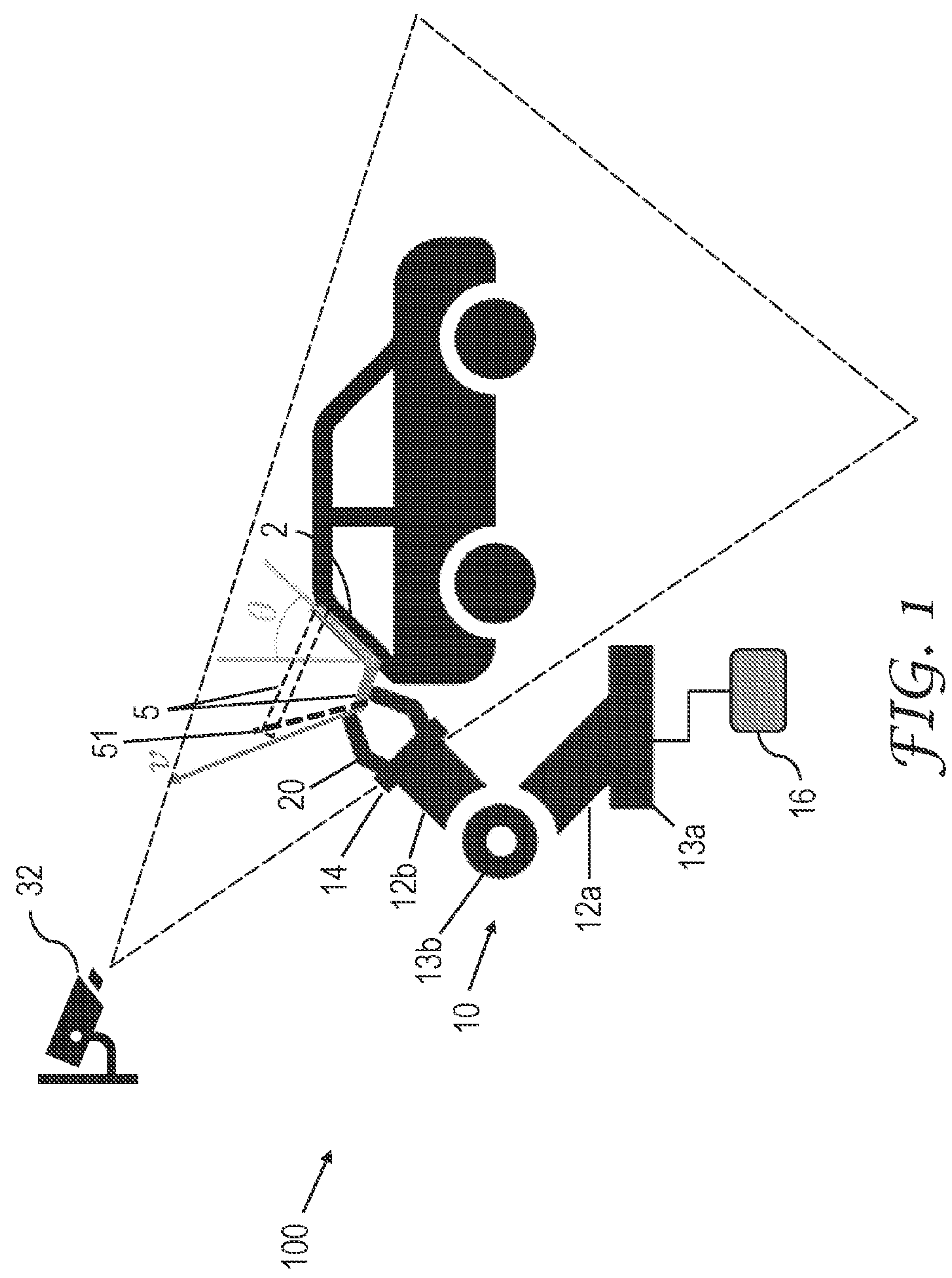
FIG. 1 illustrates a side perspective view of a tape removal system including an end-effector to remove a tape from an object surface, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently provided disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides automated systems and methods to remove tapes from object surfaces. The automated system includes a gripper for removing a tape from the object surface, and the accompanying algorithms to ensure the proper trajectory is followed to maintain the desired peel parameters. The optimal parameters may be determined in a data-driven approach, and may differ depending on tape type, substrate, and environmental and situational conditions.

FIG. 1 illustrates a side perspective view of a tape removal system 100 including an end-effector 20 to remove a tape 5 from an object surface 2, according to one embodiment. The tape removal system 100 further includes a robot arm 10. The robot arm 10 includes multiple arm sections 12*a*, 12*b* connected by joints 13*a*, 13*b*. The end-effector 20 is functionally connected to a mounting interface 14 at the distal end of the robot arm 10. The mounting interface 14 may be designed based on certain mounting standards and compatible with various end-effector tools based on the same mounting standards. In some embodiments, the mounting interface 14 may include various mechanical and electrical means to functionally connect the end-effector 20 to the robot arm 10. For example, the mounting interface may include any suitable fastening device to mechanically mount the smart end-effector 20 onto the robot arm 10. The mounting interface may further include any suitable electrical connections to communicate electrical signals between the end-effector and the robot arm or provide electrical power from the robot arm to the end-effector.

A robot controller 16 can be used to execute a robot arm command program to control the locomotion of the robot arm 10 such that the movement trajectory 51 of the end-effector 20 can be precisely controlled. In some embodiments, the robot arm command program may control the locomotion of the robot arm via a set of locomotion parameters including, for example, positions, orientations, velocities of the arm sections and joints.

In the embodiment depicted in FIG. 1, an adhesive tape 5 is attached to the object surface 2 which can be, for example, an auto part surface (e.g., a rear window surface as shown in FIG. 1). The object surface may have a planar or non-planar manifold with various surface curvatures. The robot controller 16 can control the locomotion of the robot arm such that the end-effector 20 can approach and move around the object surface 2 to grip and remove the tape 5 attached to the object surface 2. In some embodiments, the robot controller 16 may include an optional power interface to a power source thereof to provide power to the end-effector 20 in the form of electricity, pneumatic pressure, etc.

The end-effector 20 includes a gripping mechanism such as, for example, a gripper jaw, to grip an edge of the tape 5. The tape 5 can be any flexible adhesive tape. The tape 5 may include an adhesive face adhesively bonded to the object surface 2. The adhesive surface of the tape 5 may include any suitable adhesives such as, for example, a peelable adhesive including rubber, silicone, acrylic based adhesives, etc. The adhesive surface may include a non-stretch release adhesive such as, for example, a pressure-sensitive adhesive (PSA) or an epoxy adhesive. The adhesive face can be disposed on a flexible backing layer having sufficient flexibility to allow the adhesive face to be separated from the object surface. The adhesive tape 5 may also provide conformability and resiliency properties as required by desired applications. The gripping mechanism of the end-effector 20 can grip the end of a piece of tape or a tape tab via, for example, a pair of gripper jaws. In some embodiments, the end of the tape can be de-tackified, i.e., a tape tab can be provided at the edge of the tape 5. The tape tab can be formed as an extension of the flexible backing layer farther than the adhesive surface. In various embodiments, the gripping mechanism may further include a wedge, a scraper, an air blower, or a combination thereof, to facilitate the gripping of the tape tab by the gripping mechanism. For example, the tape tab can be lifted via the air blower for gripping.

In some embodiments, the end-effector 20 can include a winding mechanism for winding tape slack as the tape removal progresses. The winding mechanism can wind the tape in such a speed that a consistent distance can be maintained from the end-effector to the object surface.

In operation, the tape removal system 100 starts by initializing communication between a robot arm and an end-effector thereof. The robot arm (e.g., the robot arm 10) and the end-effector (e.g., the end-effector 20) communicate with each other to update the respective state information. Such respective state information may include, for example, power on self-tests (POST), starting orientations and coordinate systems, tape peeling parameters (e.g., a peel force, a peel velocity, a peel angle, etc.), and the like. The end-effector may receive state information of the robot arm from a robot control interface of the robot arm. The state information of the robot arm may include a set of locomotion parameters including, for example, positions, orientations, or velocities of the arm sections and joints.

The working state of the end-effector on the removal of the tape can be detected via various sensors. For example, the embodiment depicted in FIG. 1 includes a vision system 32 to provide a machine vision or 3D vision sensing. The vision system 32 can capture image data of the end-effector, which can be analyzed to determine the working state of the end-effector, and to determine whether to interrupt the initialization of the robot arm by sending notifications or instructions to the robot controller to stop or adjust the locomotion of the robot arm. For example, in some embodiments, when an emergency event is detected, notification can be sent to stop the initialization.

The vision system 32 can also provide a machine vision or 3D vision sensing to determine the state of the tape 5 on the object surface 2. When the vision system 32 detects the tape on the object surface to be removed, instructions can be sent to the robot controller to adjust locomotion of the robot arm to position the end-effector at an initial position to prepare for the removal.

The vision system 32 can further determine a removal path of the tape 5 on the object surface 2. The vision system 32 can obtain imaging data for the tape 5 on the object surface 2 to provide surface mapping information. For example, a 2D perspective representation or a contour of the tape 5 on the object surface 2 can be generated and processed to determine the removal path of the tape 5 on the object surface 2. In some embodiments, the removal path of the tape 5 on the object surface 2 can be pre-determined by scanning the surface and the corresponding coordinates (x, y, z) of the tape with respect to a peel coordinate system of the end-effector can be stored. The determined tape removal path can be communicated to the robot controller as an input to adjust the locomotion parameters of the robot arm and the peeling parameters of the end-effector.

The end-effector 20 can be mounted on a mount interface of the robot arm 10. The end-effector 20 is controlled by the locomotion of the robot arm 10 to adjust its position, orientation, movement trajectory, etc., when travelling around the object surface 2. When the end-effector grips, via a gripping mechanism, a tab of the tape 5, instructions including an initial set of peeling parameters can be sent to the end-effector to move the end-effector along the object surface to remove the tape from the object surface. The set of peeling parameters includes, for example, a peel force, a peel velocity, and a peel angle. The peel angle describes the orientation of the end-effector with respect to a surface normal. A peel angle may include, for example, a peel pitch angle, a peel yaw angle, and a peel roll angle with respect to the surface normal of the object surface, which can be determined by the vision system.

Figure 2A:
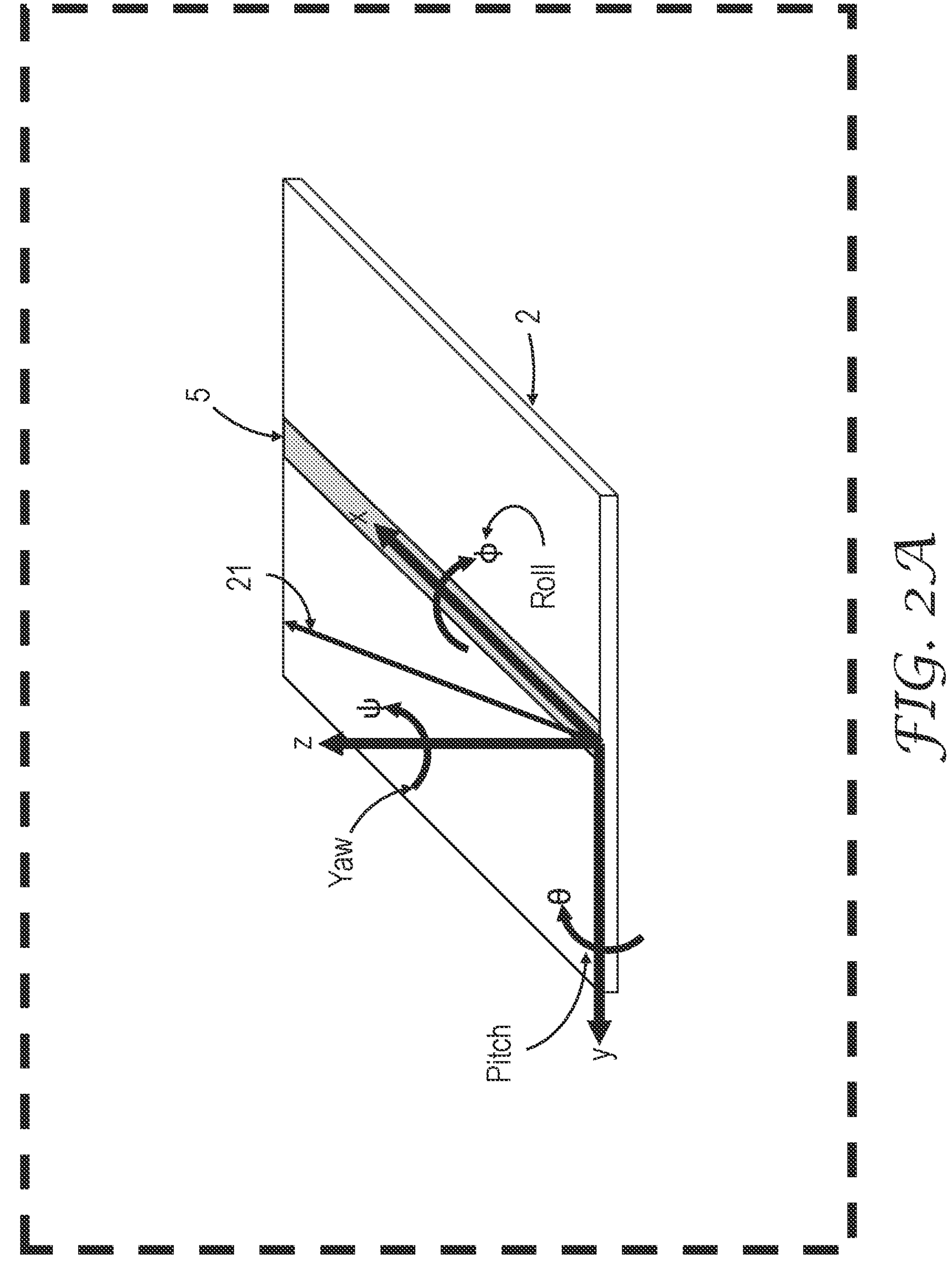
FIG. 2A illustrates a schematic diagram of a peel coordinate system for the end-effector tool of FIG. 1, according to one embodiment.
Figure 2C:
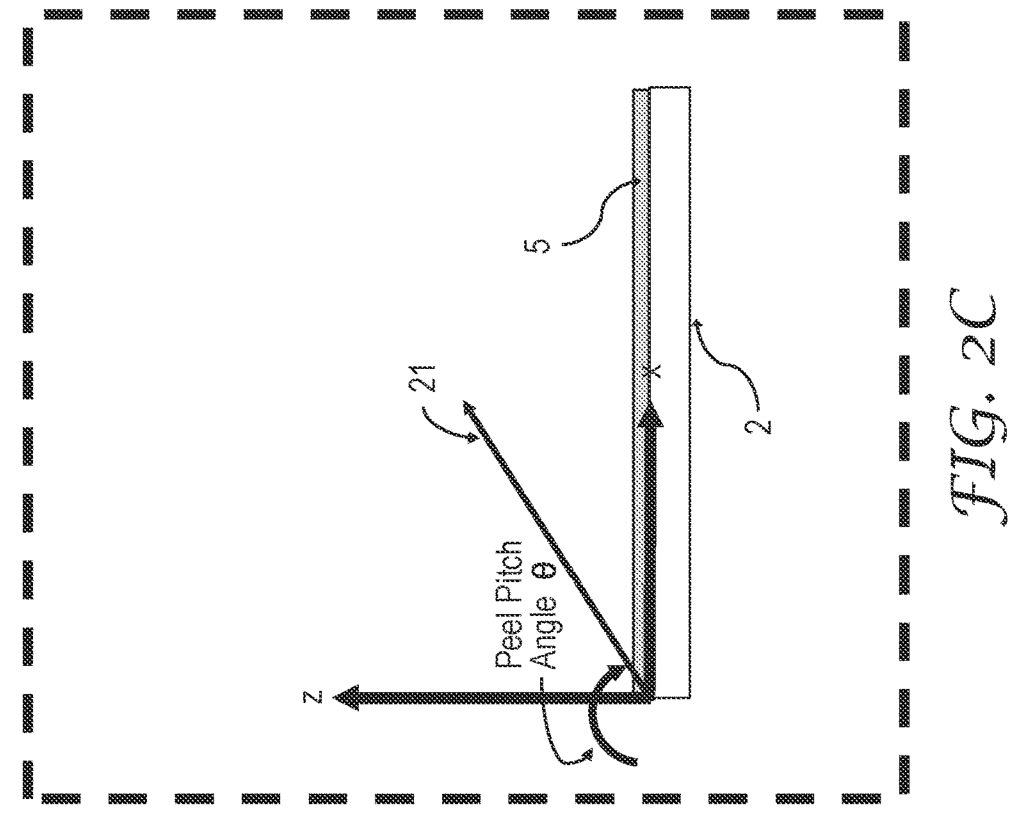
FIG. 2C illustrates a schematic diagram of a peel coordinate system for the end-effector tool of FIG. 1, according to one embodiment.
Figure 2B:
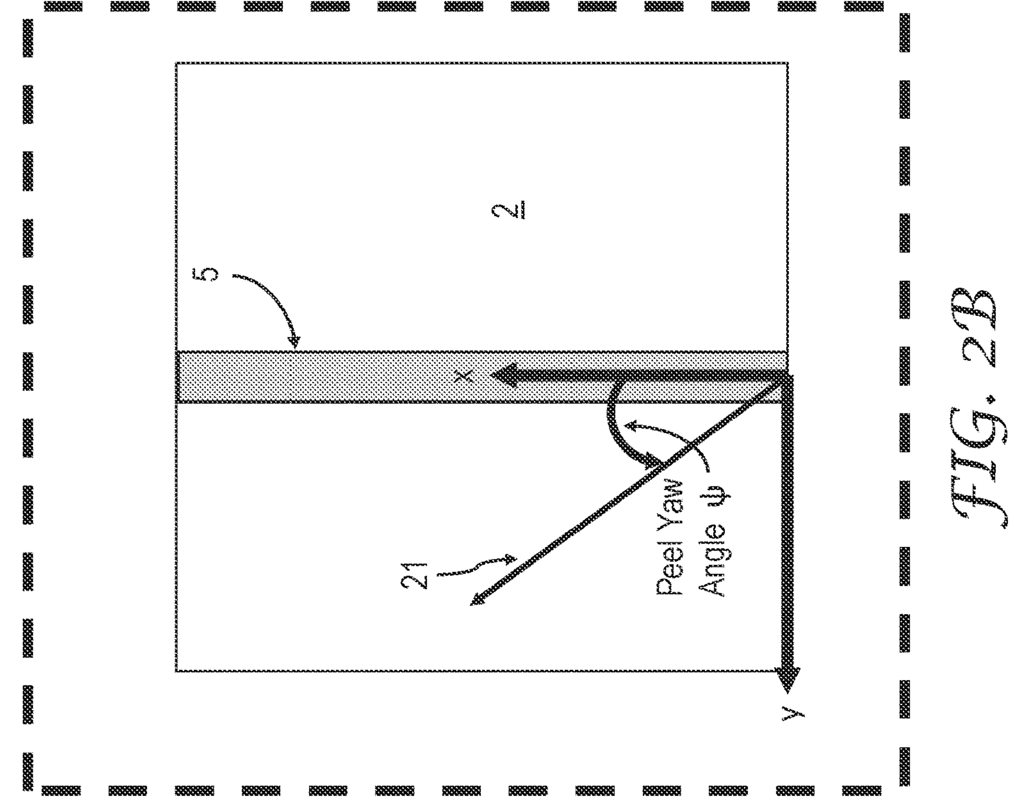
FIG. 2B illustrates a schematic diagram of a peel coordinate system for the end-effector tool of FIG. 1, according to one embodiment.

FIGS. 2A-C illustrate a schematic diagram of various peel angles in a peel coordinate system for an end-effector gripping a tape, according to some embodiments. The end-effector moves along a peel direction 21 at a peel velocity. The orientation of the end-effector can be adjusted by changing at least one of the pitch angle $\theta$, the yaw angle $\psi$, and the roll angle $\varphi$. The peel velocity can be in a range, for example from about 0.001 m/s to about 1.0 m/s. The pitch angle $\theta$ can be in a range, for example, from about 0 to about 180 degrees. The yaw angle $\psi$ can be in a range, for example, from about 0 to about 90 degrees. The roll angle $\varphi$ can be in a range, for example, from about 0 to about 5 degrees. In some embodiments, the roll angle $\varphi$ can be at a substantially fixed angle about 0 degree.

Figure 3A:
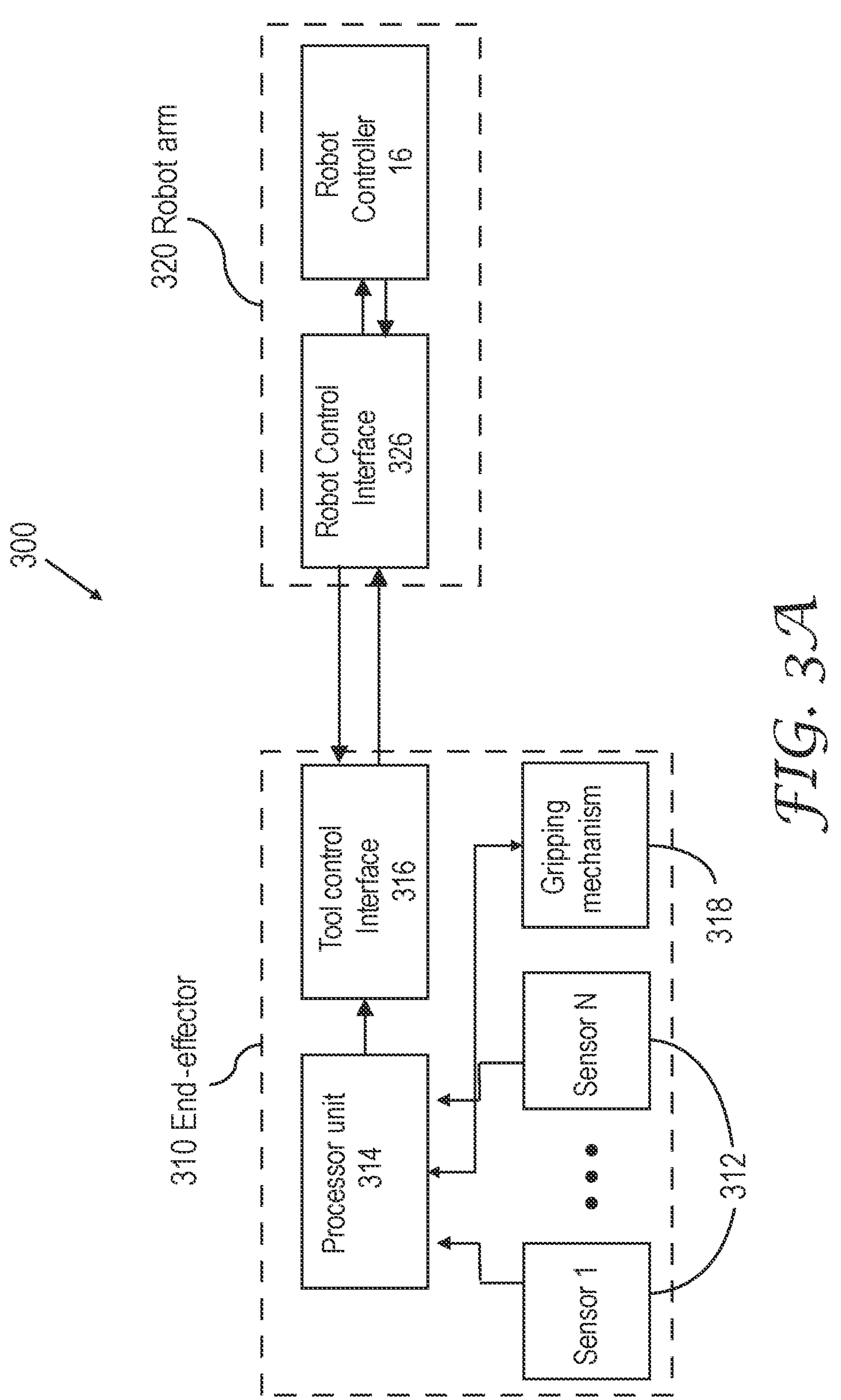
FIG. 3A illustrates a block diagram of a tape removal system, according to one embodiment.

FIG. 3A illustrates a block diagram of a tape removal system 300, according to one embodiment. The tape removal system 300 includes an end-effector 310 functionally connected to a motive robot arm 320. The end-effector 310 includes one or more sensors 312 (e.g., Sensor 1, . . . Sensor N) to detect its working state information when gripping the tape to move and the removal state of the tape. The multiple sensors 312 can include, for example, a force sensor to measure the real-time force exerted to stretch and remove the tape 5. A suitable force sensor may include, for example, a multi-axis load cell, utilizing silicon strain gauges to measure all six components of force and torque in a three-dimensional (3D) coordinate system. A force sensor may include a transducer, interface electronics, and cabling.

The sensors 312 may also include one or more imaging or vision sensors, which may be included by or supplemental to the vision system 32 of FIG. 1. In some embodiments, one or more of the vision sensors can be integrated with the vision system 32. In some embodiments, one or more of the vision sensors can be integrated with the end-effector 20 and functionally connects to the vision system 32. The vision system 32 may receive various imaging data from the imaging sensors and may process the data to obtain related information such as, for example, state information of the tape and the object surface. For example, the vision or imaging sensors located at the end-effector 20 can detect the remaining portion of the tape on the object surface and communicates the imaging data to the vision system 32. The vision system 32 can determine a removal state of the tape based on the image data. The image sensor can detect the relative position/orientation of the end-effector with respect to the object surface, and the vision system 32 can determine a real-time change in the displacement between the object surface and the end-effector based on the image data.

The sensors 312 may also include various sensors to detect environmental information such as, for example, an ambient temperature, an ambient humidity, or other conditions of the end-effector, the tape, and/or the object surface. In a working environment, one or more wireless-enabled sensing stations may be provided to include one or more sensors and a controller configured to output data indicative of sensed environmental conditions. The detected environmental condition data can be used to adjust peeling parameters such as, for example, acceptable peel velocities. Under varying temperature and humidity, adhesives and backings of a tape can have altered material properties, which causes the removal force to change for given peel parameters. By incorporating the environmental information, it is possible to obtain a more accurate estimate of the desired peel parameters to ensure clean tape removal, no backing failure, and no damage to the underlying substrate/object surface.

Sensing signals (e.g. analog sensor signals) from the sensors 312 are received and processed by a processor unit 314. The processor unit 314 may include an analog-to-digital converter (ADC) component to sample analog sensor signals and convert the analog sensor signals to digital signals. The processor unit 314 may further include a digital signal processing component to process and distill the digital signals to generate real-time tool state information, notifications, or instructions, and communicate the generated information to the robot controller. In some embodiments, the processor unit 314 may be integrated to the robot controller 16 and may not be located at the end-effector.

In some embodiments, the real-time tool state information generated by the processor unit 314 may include, for example, current position/orientation information of the end-effector with respect to the tape 5 on the object surface 2. The real-time tool state information may further include a measured peel force. The real-time tool state information may further include, for example, a removal state of the tape, a real-time change in the displacement between the object surface and the end-effector, etc.

In some embodiments, the processor unit 314 can combine the pre-determined tape removal path data and an initial set of peeling parameters of the end-effector to derive an initial movement trajectory for the end-effector tool to travel over the object surface 2 to remove the tape from the object surface 2.

In some embodiments, the real-time notifications generated by the processor unit 314 may include, for example, position notifications (e.g., a notification to the robot controller that the end-effector is at an edge of the tape), removal notifications (e.g., a notification to the robot controller that the tape is partially or completed removed), etc.

In some embodiments, the instructions generated by the processor unit 314 may include, for example, a tool-operation instruction regarding how to control the operation of the end-effector, a locomotion instruction to instruct the robot controller to adjust the position of the end-effector, the movement trajectory of the end-effector, a peel velocity, an orientation of the end-effector, etc. A tool-operation instruction may include, for example, an on/off instruction to the robot controller to turn on/off the end-effector, a motor control instruction to the robot controller to control the operation of a motor of the end-effector, etc.

The real-time state information, notifications, or instructions from the end-effector 310 can be sent to the robot controller 16 via the tool control interface 316 and the robot control interface 326. The robot controller 16 can then use the real-time state information to simultaneously update the locomotion parameters of the robot arm such that the movement trajectory of the end-effector 310 can be precisely controlled. The robot controller 16 can also control the tape removal system 100 accordingly by taking actions upon the notification or following the instructions from the end-effector 310. In some embodiments, the robot controller 16 may receive real-time state information, notifications, or instructions from the end-effector, interpret the received information, check whether the notifications or instructions are compatible with pre-set rules, and implement instructions correspondingly. For example, the robot controller 16 may provide the end-effector with a movement vector for its position adjustment with respect to the tape on the object surface. The robot controller 16 may instruct the robot arm to provide an appropriate force to stretch the tape away from the object surface. The robot controller 16 can provide an emergency stop command to the end-effector to stop when an emergency condition is determined by the robot controller. The robot controller 16 can also instruct various parts to conduct other operations.

Figure 3B:
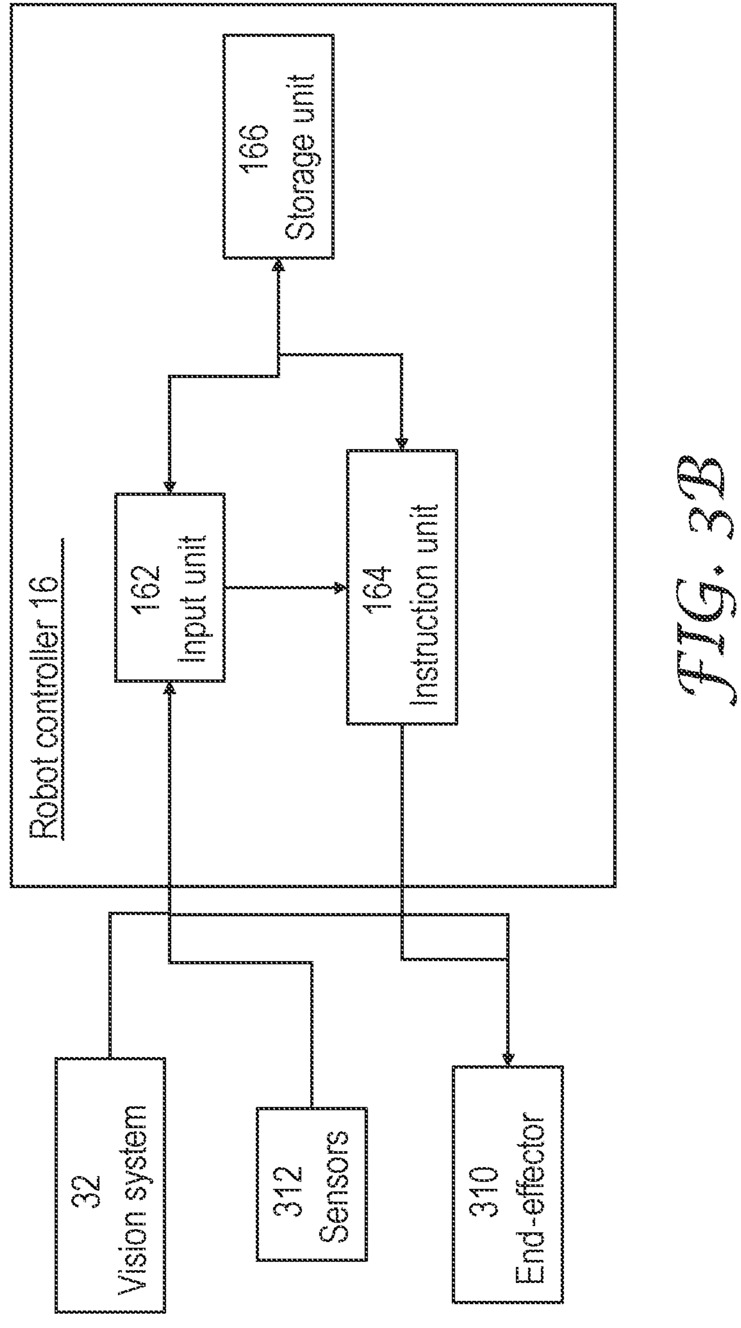
FIG. 3B illustrates a block diagram of a robot controller, according to one embodiment.

FIG. 3B is a block diagram of the robot controller 16, according to one embodiment. The robot controller 16 functionally connects to various parts of the system and regulates the operation of the system by various control instruments, processors, storage devices, and the like. In the depicted embodiment of FIG. 3B, the robot controller 16 includes an input unit 162 to receive various sensing data from the vision system 32, the sensors 312, and/or the end-effector 310. For example, the input unit 162 may receive imaging data from an imaging sensor regarding the remaining portion of the tape on the object surface. The robot controller 16 further includes an instruction unit 164 to process the data received by the input unit 162 and provide instructions to the various parts of the system based on the received data. For example, the instruction unit 164 can process the received imaging data to determine the removal state of the tape on the object surface. In some embodiments, the vision system 32 may obtain and process imaging data and send the processed imaging data to the input unit 162. The robot controller 16 further includes a storage unit 166 to store information including, for example, a pre-determined relationship between peeling parameters for various pairs of tape and substrate, a pre-determined tape removal path on a substrate/object surface, pre-set rules or policies, dynamically-updated state information, etc. The pre-set rules or policies can be pre-determined for various events that may occur during the removal of the tape. For example, a user operating the system can set a rule that any detection of a broken tape is an urgent event.

Figure 4:
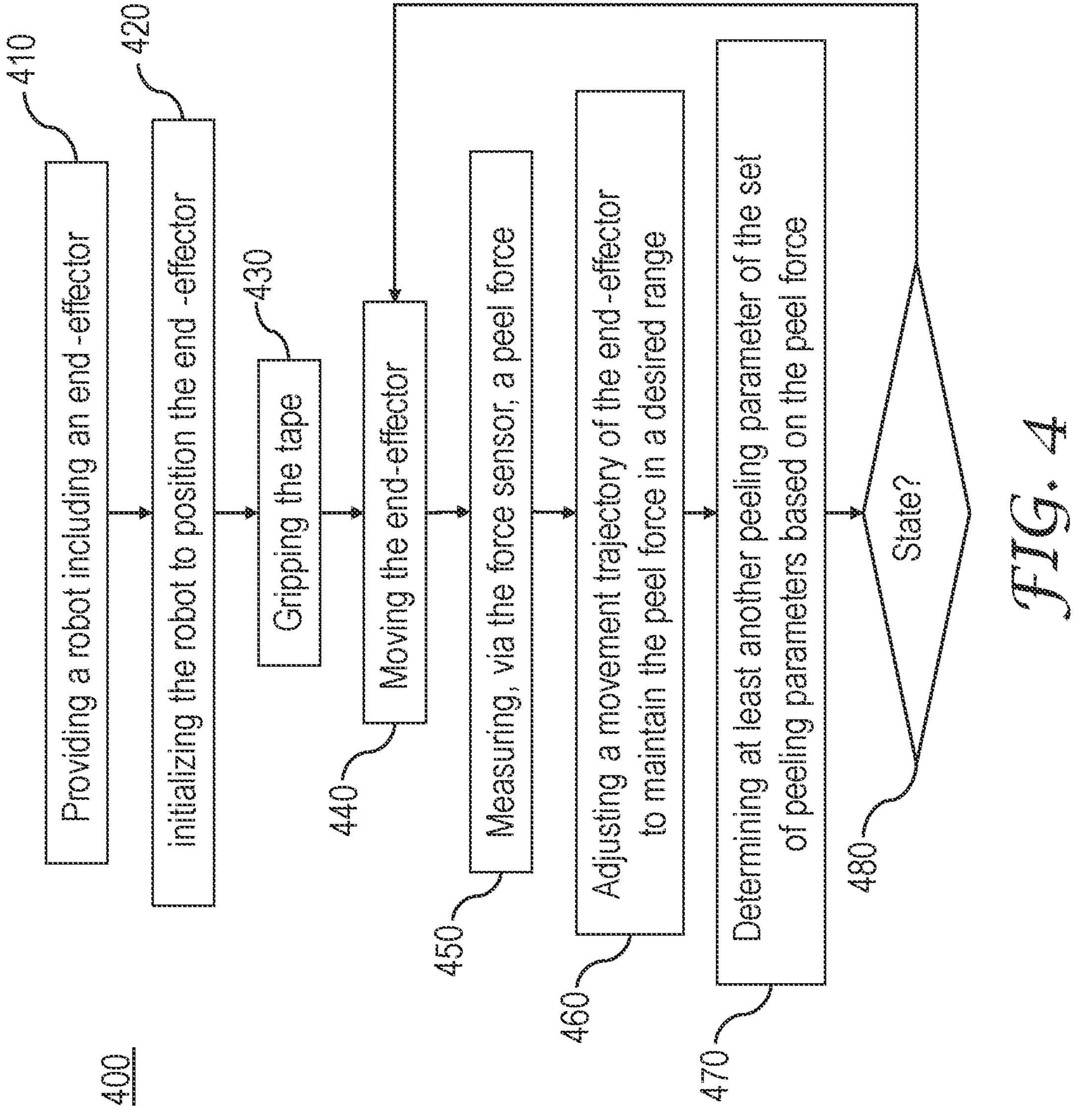
FIG. 4 illustrates a flow diagram of a method of removing a tape from an object surface, according to one embodiment.

FIG. 4 illustrates a flow diagram of a method 400 of removing a tape from an object surface, according to one embodiment. The method 400 can be implemented via various tape removal systems described herein including the tape removal system 300 of FIG. 3A, 3B. At 410, a robot is provided with an end-effector. The robot can include a robot arm such as the robot arm 10 of FIG. 1. An end-effector such as the end-effector 20 of FIG. 1 is functionally connected to the distal end of the robot arm 10. The end-effector includes a gripping mechanism configured to grip an edge of a tape on an object surface. The end-effector further includes a force sensor to measure the real time stretching force exerted on the tape when removing the tape from the object surface. The method 400 then proceeds to 420.

At 420, the tape removal system starts by initializing the robot to position the end-effector and prepare for the removal of the tape from the object surface. The robot controller 16 can communicate with various parts of the system such as, the robot arm, the end-effector, the vision system, and various sensors to update the respective position/location information, state information, and other related information.

A removal path of the tape on the object surface can be determined and updated with the robot controller 16. The removal path can be a 2D perspective representation or a contour of the tape on the object surface. Such a 2D perspective representation or a contour of the tape can be pre-determined or determined in real time by the vision system 32. For example, the vision system may include a camera to scan the object surface to locate the tape on the object surface and develop a 2D perspective representation or a contour of the tape with respect to a peel coordinate system of the end-effector. In some embodiments, a geometry of the object surface on which the tape is attached can be represented by a digital two-dimension (2D) or a digital three-dimensional (3D) model. The digital models can be in the form of an electronic file for computer-aided design (CAD), computer-aided manufacturing (CAM), computer-aided engineering (CAE), or other suitable applications. The digital models can be pre-determined and stored, e.g., in the storage unit 166 of FIG. 3B, to be retrieved by the robot controller 16. With such location and profile information of the tape on the object surface, the robot controller 16 can instruct the robot arm to move the end-effector to approach the tape attached on the object surface.

In some embodiments, initializing the robot may include providing an initial set of peeling parameters to the end-effector, including a peel force, a peel velocity, and a peel angle (e.g., a peel pitch angle, a peel yaw angle) with respect to a surface normal of the object surface. In some embodiments, initializing the robot further may include providing an initial movement trajectory matching the removal path of the tape. A movement trajectory provides a path in the peel coordinate system to move the end-effector. The initial movement trajectory of the end-effector can be determined based on the initial peeling parameters (e.g., an initial peel velocity, an initial peel angle, etc.) and the removal path of the tape on the object surface.

The method 400 then proceeds to 430 where the robot controller instructs to the end-effector to grip, via the gripping mechanism, a tab of the tape on the object surface. The gripping mechanism of the end-effector can grip the tape tab via, for example, a pair of gripper jaws. In various embodiments, a wedge, a scraper, an air blower, or a combination thereof can be provided to facilitate the gripping of the tape tab by the gripping mechanism. The vision system 32 can monitor the gripping process and provide the related orientation/location/state information of the gripping mechanism of the tape tab to the robot controller 16 such that the robot controller 16 can change the locomotion parameters of the robot arm, and/or adjust the orientation/location of the gripping mechanism with respect the tape tab. Once the end-effector grips the tape tab, the method 400 then proceeds to 440.

At 440, when the end-effector grips the tape tab, the robot controller 16 instructs the robot arm to move the end-effector along the object surface to remove the tape from the object surface according to the initial set of peeling parameters. The initial set of peeling parameters includes, for example, an initial peel force, an initial peel velocity, an initial peel angle, etc. The initial set of peeling parameters can be pre-determined based on test data on the specific pair of tape material and object surface material. The methods 400 then proceeds to 450.

Figure 5:
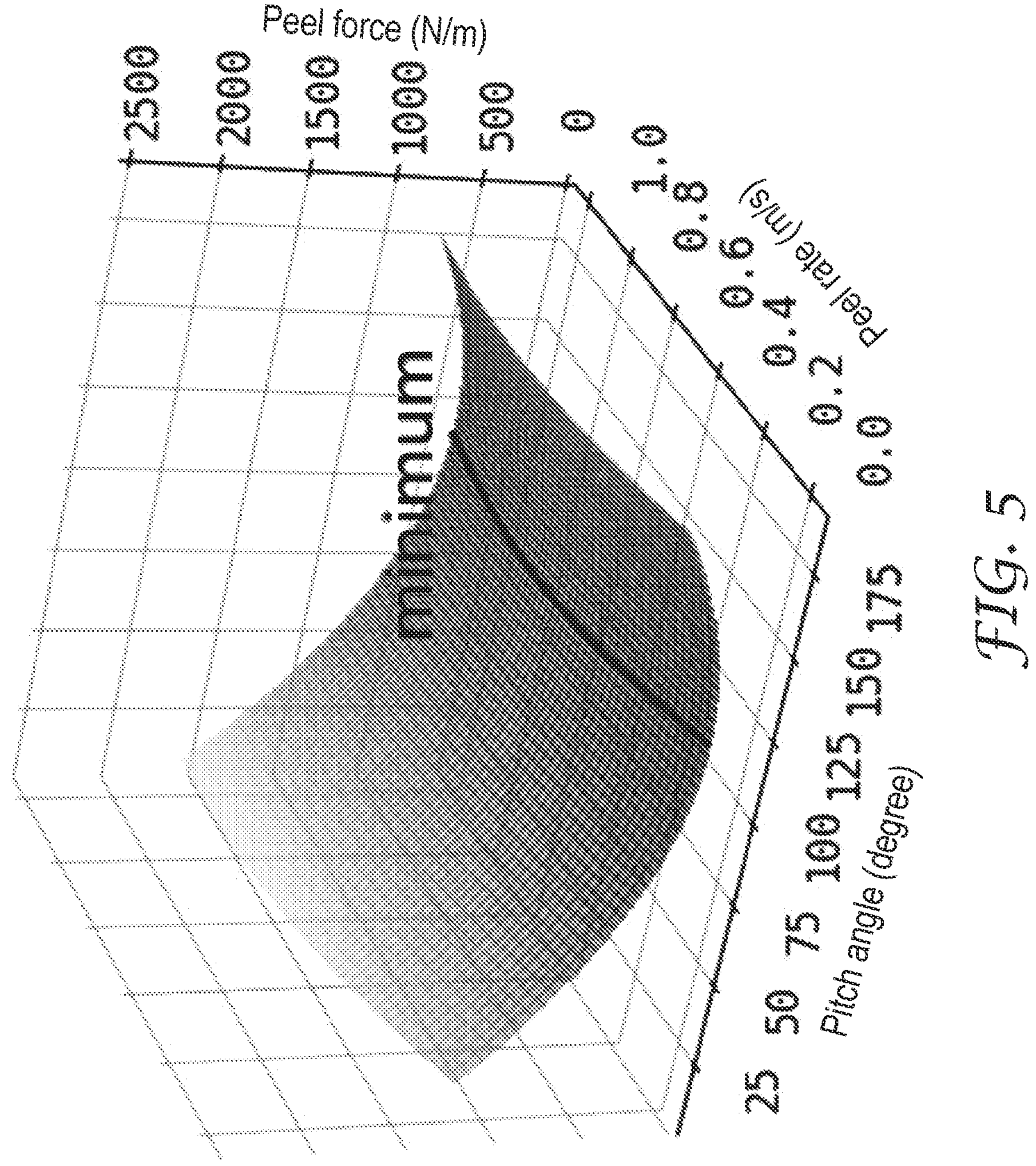
FIG. 5 is a 3D plot of peel force (N/m) versus peel pitch angle (degrees) and peel rate (m/s) for a pair of tape and substrate.

FIG. 5 is a 3D plot of peel force (N/m) versus peel pitch angle (degrees) and peel rate (m/s) for a specific pair of tape material and object surface material where the tape is attached to the object surface in a planar configuration. By using the pre-measured test data for a selected tape/substrate pair, an optimal peel pitch angle can be determined, and the rate parameter can be chosen either automatically or by the user (to meet cycle time demands) and the peel rate can be held to the minimum peel force value. Additional constraints can also be considered in the test data, including, for example, peel yaw angle, substrate conditions, ambient/environmental conditions, roll down, etc., to provide a distinct description of the tape/substrate pair regarding peeling parameters. The test data can be stored, e.g., in the storage unit 166 of FIG. 3B. The robot controller can determine a suitable set of peeling parameters based on the test data to prevent peeling defects such as, for example, slivering, breakage, other tape failure, or damages to the substrate/object surface. When the tape is used as a mask on the object surface for surface painting, the optimized peeling parameters based on the test data can help to maintain clean removal and sharp paint lines.

At 450, the robot controller 16 instructs the force sensor to measure a peel force that exerts on the tape to remove the tape from the object surface. The force measurement can be obtained from, for example, a multi-axis force sensor. The measured data may contain force and torque measurement data along the x, y, and z axes of the force sensor. The force measurements are transformed from the force sensor frame into the robot peel coordinate frame. The peel force measurement is then calculated by taking the Euclidean (L2) norm of the rotated x, y, and z force measurements obtained from the sensor. The measurement can be filtered via a low-pass filter to reduce noise, and the value is then compared to the expected average peel force value for the given peel parameters. The method 400 then proceeds to 460.

At 460, the robot controller 16 instructs the robot arm to adjust a movement trajectory of the end-effector to maintain a value of the peel force in a desired range. The end-effector has been provided with an initial movement trajectory matching the removal path of the tape when the system is initialized. During the removal of the tape, the movement trajectory needs to be adjusted for various reasons. In one case, when the tape is gripped by the end-effector to remove, the portion of the tape that is removed may be stretched and elongated. In another case, the object surface on which the tape is attached may be moved during the removal. The movement trajectory needs to be adjusted to accommodate such a deformation or displacement of the tape and/or the object surface, individually or collectively, such that the value of the peel force remains in a desired range. The method 400 then proceeds to 470.

For given some peel parameters (e.g., peel angles, peel rate, etc.), there is a given threshold of average peel force values acceptable to continue on the planned robotic trajectory. The threshold can be, for example, the two-sigma standard deviation above or below the average peel force for given peel parameters. When the average peel force values exceed this threshold, the planned robotic trajectory needs to be altered or adjusted to maintain the desired peel force. In some embodiments, the adjustment of robotic trajectory can be done by first increasing or decreasing the peel pitch angle. If the force value is outside of the threshold limits, the pitch angle then can be increased or decreased to either raise or lower the peel force back into the acceptable range. Determining whether to increase or decrease can be done by using pre-determined data on the specific pair of tape material and object surface material, such as seen in FIG. 5. By fixing the other peel parameters, a slice of the calculated surface can be taken, and at the current peel angle, the positivity of the slope of the slice can be determined. A negative slope may either indicate a need to shift the parameter lower or higher, depending on whether the excess force is lower or higher, respectively. The opposite is true for a positive slope, which may indicate a need to shift the parameter higher or lower, depending on whether the excess force is lower or higher, respectively. In the event that a pitch angle cannot be increased or decreased as needed (such as when the pitch angle is at the upper or lower bounds, or is at a minimum/maximum), the peel yaw angle can be increased or decreased according to the same logic. The changes in angle can amount to a positional offset being applied to the existing robotic trajectory, in order to maintain a new peel pitch or peel yaw angle. The positional offset can be calculated by using the peel coordinate system from FIGS. 2B and 2C, where the new peel angle can determine a new peel direction, and based on the current pose of the robot, an offset is applied to achieve the new peel direction. In some cases, when neither the peel pitch nor peel yaw can be altered according to the altering logic, the peel velocity can next be altered, increasing or decreasing by the altering logic. The change in velocity may not alter the robotic path but may alter the time step size between robotic path points. For each of the described trajectory alteration methods, the value of the change in pitch angle, yaw angle, or velocity amount can be determined by taking the excess peel force amount (i.e., the amount of force over the threshold) and multiplying by some constant. The constant can be equal to between about 0 and about five percent of the current parameter value. The constant times the excess peel force amount can then be added to or subtracted from the parameter value, based on the altering logic to determine whether to increase or decrease the parameter value.

At 470, the robot controller 16 instructs the end-effector to adjust at least another peeling parameter of the set of peeling parameters based on the peel force. In some embodiments, a peel velocity and/or a peel angle can be adjusted based on the maintained peel force according to a pre-determined relationship between at least some of the peeling parameters. For example, FIG. 5 shows the relationship between the peel force (N/m), the peel pitch angle (degrees), and the peel rate (m/s). For a given peel force, the appropriate values for the peel pitch angle (degrees), and the peel rate (m/s) can be selected accordingly. Similarly, for a given peel force, the appropriate values for the peel yaw or roll angle (degrees) can be selected accordingly. The method 400 then proceeds to 480.

At 480, the robot controller 16 instructs various sensors (e.g., the vision system 32, the sensors 312, etc.) to monitor and determine a state of the tape on the object surface. According to the monitored state, the robot controller 16 can provide various instructions to the associated parts. For example, in one case, the robot controller 16 can receive sensor data from the sensors and process the data to verify the removal of the tape from the object surface. The sensors can detect a remaining portion of the tape on the object surface, and the robot controller 16 can verify the completion of the removal when there is no remaining portion on the object surface. In another case, the robot controller 16 can detect whether an event occurs that renders an adjustment of the system. For example, the robot controller 16 can process the sensor data to detect a movement of the object surface during the removal of the tape that renders a bad path for the end-effector. The robot controller 16 can instruct the robot arm to adjust the location of the end-effector to accommodate such a displacement. When the automatic adjustment is not successful, the robot controller 16 can send a notification regarding the state. In various embodiments, the robot controller 16 can receive sensing data from various environmental sensors to determine various environmental conditions including, for example, an ambient temperature and an ambient humidity.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but rather is to be controlled by the limitations set forth in the claims and any equivalents thereof.

LISTING OF EXEMPLARY EMBODIMENTS

Exemplary embodiments are listed below. It is to be understood that any one of embodiments 1-12 and 13-15 can be combined.

Embodiment 1 is a method of removing a tape attached to an object surface, the method comprising:

- providing a robot including an end-effector, the end-effector comprising a gripping mechanism and a force sensor;
- initializing the robot to position the end-effector with respect to the tape on the object surface;
- gripping, via the gripping mechanism, an end of the tape;
- moving the end-effector along the object surface to remove the tape from the object surface according to a set of peeling parameters; and
- while the end-effector moves along the object surface to remove the tape,
  - measuring, via the force sensor, a peel force;
  - adjusting a movement trajectory of the end-effector to maintain a value of the peel force in a desired range; and
  - determining at least another peeling parameter of the set of peeling parameters based on the peel force, comprising determining at least one of a peel velocity and a peel angle.

Embodiment 2 is the method of embodiment 1, wherein determining the at least another peeling parameter comprises predetermining a relationship between at least some of the peeling parameters for the tape on the object surface.

Embodiment 3 is the method of embodiment 2, wherein the predetermined relationship is between the peeling force, the peeling velocity, and the peeling angle.

Embodiment 4 is the method of any one of embodiments 1-3, wherein initializing the robot comprises determining a removal path of the tape on the object surface.

Embodiment 5 is the method of embodiment 4, wherein determining the removal path of the tape on the object surface comprises a digital two-dimension (2D) or a digital three-dimensional (3D) model of the tape on the object surface.

Embodiment 6 is the method of embodiment 4 or 5, wherein initializing the robot further comprises providing an initial movement trajectory matching the removal path of the tape.

Embodiment 7 is the method of any one of embodiments 1-6, wherein initializing the robot comprises locating the tab of the tape on the object surface.

Embodiment 8 is the method of any one of embodiments 1-7, further comprising determining a state of the tape on the object surface.

Embodiment 9 is the method of embodiment 8, wherein determining the state comprises verifying the removal of the tape from the object surface.

Embodiment 10 is the method of embodiment 8 or 9, wherein determining the state comprises detecting a remaining portion of the tape on the object surface.

Embodiment 11 is the method of any one of embodiments 8-10, wherein determining the state comprises detecting a movement of the object surface during the removal of the tape.

Embodiment 12 is the method of any one of embodiments 8-11, wherein determining the state comprises determining environmental conditions including an ambient temperature and an ambient humidity.

Embodiment 13 is an automated system to remove a tape from an object surface, the system comprising:

- an end-effector comprising a gripping mechanism and a force sensor;
- a vision system comprising one or more imaging sensors to obtain imaging data for the tape, the object surface, and the end-effector; and
- a controller functionally connected to the end-effector and the vision system, wherein the controller is configured to:
  - initialize the end-effector with respect to the tape on the object surface;
  - grip, via the gripping mechanism, an end of the tape;
  - move the end-effector along the object surface to remove the tape from the object surface according to a set of peeling parameters; and
  - while the end-effector moves along the object surface to remove the tape,
    - measure, via the force sensor, a peel force;
    - adjust a movement trajectory of the end-effector to maintain a value of the peel force in a desired range; and
    - determine at least another peeling parameter of the set of peeling parameters based on the peel force, comprising determining at least one of a peel velocity and a peel angle.

Embodiment 14 is the automated system of embodiment 13, further comprising a robot arm, wherein the end-effector is mounted on the robot arm.

Embodiment 15 is the automated system of embodiment 13 or 14, wherein the controller is further configured to determine a state of the tape on the object surface based on the imaging data from the vision system.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Test Methods

Test Method 1: Robotic Analysis of Peel Adhesion Strength

A six-axis robot, with an end effector consisting of a mechanical gripper attached to a 6-axis force/torque sensor, was used to peel tape samples from a substrate. The substrate was cleaned using a 50/50 isopropyl alcohol to water ratio. The tape was 18 millimeters wide by 200 millimeters long. The tape was prepared by placing manually onto a stainless-steel substrate, then using a 4.5 pounds (2.0 kg), 2-inch-wide (5.1 cm) weighted roller, the tape was rolled down to induce wet-out of the adhesive. The roller was moved at approximately 90 inches per minute (0.0381 meters per second). The robot then gripped an edge of the tape and peeled the tape at a 90-degree angle from the substrate at a rate of 90 inches per minute. The force of the tape was collected from the force torque sensor, and statistical measures including, but not limited to, mean and standard deviation of peel adhesion strength were calculated in newtons per meter.

Tape Peel End Effector

A tape peel end effector was created for gripping tape samples. The design consisted of a mounting plate, a force/torque sensor, a connector plate, and an electromechanical gripping mechanism. The mounting plate was manufactured using ¼ inch (0.64 cm) thick aluminum. The design of the mounting plate involved machining holes to match the hole pattern of the tool flange of the robot, and machining holes at another location on the plate to match the hole pattern of one side of the force/torque sensor. The opposite side of the force/torque sensor was fastened to the connector plate, made of ¼ inch thick aluminum, which had holes machined to match the hole pattern of the force/torque sensor. Holes were machined at another location on the connector plate to match the hole pattern on the electromechanical gripping mechanism. The electromechanical gripping mechanism involved two opposite acting linear actuators which moved linearly towards the other when electrically activated. The linear actuators had a curved aluminum jaw attached to each, into which the tape is fed to grip the tape. The end effector was assembled by: fastening the mounting plate to the tool flange of the robot, fastening the force/torque sensor to the mounting plate, fastening the connector plate to the force/torque sensor, and fastening the electromechanical gripping mechanism to the connector plate.

Example 1

A six-axis robot was used to remove a pressure-sensitive adhesive (PSA) tape from a planar glass surface. The adhesive was prepped as in Test Method 1, with the caveats that the removal speed and pitch angle were varied. The results can be seen in Table 1. The peel adhesion strength was obtained by averaging the peel force and dividing it by the adhesive width (0.018 meters). Because the peel front velocity was nominally 0.1 meters per second, these values were used to determine a local minimum in peel adhesion strength for this pressure-sensitive adhesive at the nominal peel front velocity of 0.1 meters per second. This was done by fitting a second-degree polynomial to the data, and using gradient descent to find the local minimum, which was at 115.2 degrees, giving an average peel adhesion strength value of 245.06 N/m.

TABLE 1

| Peel Front Velocity (m/s) | Pitch Angle (Deg) | Yaw Angle (Deg) | Average Peel Adhesion Strength (N/m) |
|---|---|---|---|
| 0.1154 | 26.4 | 0 | 972.54 |
| 0.1202 | 63.4 | 0 | 468.78 |
| 0.1145 | 96.9 | 0 | 292.52 |
| 0.1200 | 125.3 | 0 | 287.46 |
| 0.1070 | 158.7 | 0 | 347.93 |
| 0.1170 | 179.8 | 0 | 639.97 |

Example 2

The process described in Example 1 was carried out for a number of peel pitch angles ranging from 30 to 180 degrees, as well as a number of peel front velocities, ranging from 0.001 to 1.0 meters per second. The average peel adhesion force for the sample was obtained from the force torque sensor, and each point was used in a support vector regression algorithm to create a two-dimensional manifold illustrating the dynamic nature of the average peel adhesion force as peel-front velocity and pitch changed. See FIG. 5, where the x (front) axis is angle, y (side) axis is velocity and z (vertical) axis is average peel adhesion force.

Prophetic Example 1

A multi-axis robot is used to remove an adhesive tape from a two-dimensional manifold while maintaining the minimum average peel adhesion force. The robot attempts to maintain a minimum average peel adhesion force. When the two-dimensional manifold has a non-constant surface normal along a desired peel path, the robotic trajectory must be updated to maintain the desired peel-front angle and velocity that results in the minimum average peel adhesion force.

Prophetic Example 2

During removal of an adhesive tape from a two-dimensional manifold, the adhesive can be subject to forces causing deformation of the adhesive tape. When the deformation is too large, the desired peel-front angle and velocity may not be achieved. The robotic trajectory is therefore updated according to the deformation of the adhesive tape to maintain the desired peel-front angle and velocity values.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A method of removing a tape attached to an object surface, the method comprising:
- providing a robot including an end-effector, the end-effector comprising a gripping mechanism and a force sensor;
- initializing the robot to position the end-effector with respect to the tape on the object surface;
- determining a set of peeling parameters based on one or more of a tape type associated with the tape, a substrate type associated with the object surface, one or more environmental conditions associated with a location of the object surface and the tape, or one or more situational conditions associated with the location of the object surface and the tape;
- gripping, via the gripping mechanism, an end of the tape;
- moving the end-effector along the object surface to remove the tape from the object surface according to the set of peeling parameters; and
- while the end-effector moves along the object surface to remove the tape,
  - measuring, via the force sensor, a peel force;
  - adjusting a movement trajectory of the end-effector to maintain a value of the peel force in a desired range; and
  - determining at least another peeling parameter of the set of peeling parameters based on the peel force, the at least another peeling parameter comprising at least one of a peel velocity or a peel angle.

2. The method of claim 1, wherein determining the at least another peeling parameter comprises predetermining a relationship between at least some of the peeling parameters for the tape on the object surface.

3. The method of claim 2, wherein the predetermined relationship is between the peeling force, the peeling velocity, and the peeling angle.

4. The method of claim 1, wherein initializing the robot comprises determining a removal path of the tape on the object surface.

5. The method of claim 4, wherein determining the removal path of the tape on the object surface comprises a digital two-dimension (2D) or a digital three-dimensional (3D) model of the tape on the object surface.

6. The method of claim 4, wherein initializing the robot further comprises providing an initial movement trajectory matching the removal path of the tape.

7. The method of claim 1, wherein initializing the robot comprises locating the end of the tape on the object surface.

8. The method of claim 1, further comprising determining a state of the tape on the object surface.

9. The method of claim 8, wherein determining the state comprises verifying the removal of the tape from the object surface.

10. The method of claim 8, wherein determining the state comprises detecting a remaining portion of the tape on the object surface.

11. The method of claim 8, wherein determining the state comprises detecting a movement of the object surface during the removal of the tape.

12. The method of claim 8, wherein determining the state comprises determining environmental conditions including an ambient temperature and an ambient humidity.

13. An automated system to remove a tape from an object surface, the system comprising:
- an end-effector comprising a gripping mechanism and a force sensor;
- a vision system comprising one or more imaging sensors to obtain imaging data for the tape, the object surface, and the end-effector; and
- a controller functionally connected to the end-effector and the vision system, wherein the controller is configured to:
  - initialize the end-effector with respect to the tape on the object surface;
  - grip, via the gripping mechanism, an end of the tape;
  - determine a set of peeling parameters based on one or more of a tape type associated with the tape, a substrate type associated with the object surface, one or more environmental conditions associated with a location of the object surface and the tape, or one or more situational conditions associated with the location of the object surface and the tape;
  - move the end-effector along the object surface to remove the tape from the object surface according to the set of peeling parameters; and
  - while the end-effector moves along the object surface to remove the tape,
    - measure, via the force sensor, a peel force;
    - adjust a movement trajectory of the end-effector to maintain a value of the peel force in a desired range; and
    - determine at least another peeling parameter of the set of peeling parameters based on the peel force, the at least another peeling parameter comprising at least one of a peel velocity or a peel angle.

14. The automated system of claim 13, further comprising a robot arm, wherein the end-effector is mounted on the robot arm.

15. The automated system of claim 13, wherein the controller is further configured to determine a state of the tape on the object surface based on the imaging data from the vision system.

* * * * *